United States Patent [19]

Yonenaga et al.

[11] Patent Number: 5,646,872
[45] Date of Patent: Jul. 8, 1997

[54] INFORMATION PROCESSING APPARATUS

[75] Inventors: Hitoshi Yonenaga; Shigeru Matsuoka, both of Hitachi, Japan

[73] Assignee: Hitachi, Ltd., Tokyo, Japan

[21] Appl. No.: 186,708

[22] Filed: Jan. 25, 1994

[30] Foreign Application Priority Data

Jan. 25, 1993 [JP] Japan ................... 5-010269

[51] Int. Cl.$^6$ ............... G06F 3/00; G06F 13/00; G06F 1/16
[52] U.S. Cl. ................. 364/710.13; 364/708.1; 400/83; 400/680; 361/680
[58] Field of Search ............ 364/710.13, 708.1, 364/705.01, 705.02; 235/379; 400/624, 625, 691, 692, 715, 82; 248/118.1; 346/145; 347/108; 361/680

[56] References Cited

U.S. PATENT DOCUMENTS

| | | | |
|---|---|---|---|
| 4,808,017 | 2/1989 | Sherman et al. | 400/83 |
| 4,839,837 | 6/1989 | Chang | 361/680 |
| 4,859,092 | 8/1989 | Makita | 400/83 |
| 4,898,483 | 2/1990 | Iizuka | 400/61 |
| 4,940,313 | 7/1990 | Hamatani | 350/342 |
| 5,165,145 | 11/1992 | Sherman | 16/341 |
| 5,345,403 | 9/1994 | Ogawa et al. | 364/708.1 |

FOREIGN PATENT DOCUMENTS

| | | |
|---|---|---|
| 2-45817 | 2/1990 | Japan . |
| 2-27218 | 2/1990 | Japan . |
| 2-160566 | 6/1990 | Japan . |
| 2-236710 | 9/1990 | Japan . |
| 2-148352 | 12/1990 | Japan . |
| 4-84316 | 3/1992 | Japan . |
| 4-327972 | 11/1992 | Japan . |

Primary Examiner—Paul P. Gordon
Assistant Examiner—Emmanuel L. Moise
Attorney, Agent, or Firm—Antonelli, Terry, Stout & Kraus, LLP

[57] ABSTRACT

An information processing apparatus of built-in printer type which is excellent in portability and operability, comprising a printer paper receptacle arranged on the lower side of a keyboard, and a printer unit constructed on the side of the keyboard normally facing the user. Further, a printed paper receptacle is arranged on the rear side of a display unit. The paper ejection slit of the printer unit and the paper insertion slit of the printed paper receptacle are formed so as to be united when the display unit is closed. When a print operation is performed with the display unit closed, a sheet of paper printed on by the printer unit is received into the printed paper receptacle through the ejection slit as well as the insertion slit, automatically in the closed state of the apparatus.

14 Claims, 12 Drawing Sheets

FIG. 1

DIRECTION OF OPERATING
INPUT UNIT

INFORMATION PROCESSING APPARATUS

BACKGROUND OF THE INVENTION

The present invention relates to an information processing apparatus, for example, a word processor, which has a built-in printer and which fulfills the function of printing the edited results of a document, etc. on a medium such as paper.

In general, a prior-art information processing apparatus with a built-in printer has the printer arranged at an upper rear part within the body of the apparatus. The casing of the body is provided with an opening or inlet through which sheets of printer paper are supplied to the printer, and a plate-like paper guide on which the sheets of paper are caused to lean in order to lead them to the opening. Further, the casing is provided with a paper ejection guide by which the printer paper having been printed on is led out of the apparatus. Such an information processing apparatus is, for example, a document editing apparatus disclosed in Japanese Patent Application No. 197951/1990.

When executing a print operation in the information processing apparatus of the type specified above, the operator of the apparatus inserts the printer paper manually along the paper guide and thereafter starts the printing. After printing, the operator removes the printer paper coming out of the apparatus along the paper ejection guide, as a printed result.

With the prior-art technique, the operator must manually insert and remove the printer paper and the printed paper, and the troublesome operations are forced upon him/her. This poses the problem that the operability of the apparatus is inferior with regard to the printing operation.

There is also a system (for example, a technique disclosed in Japanese Patent Application No. 313897/1988) wherein, in order to solve the aforementioned problem, an automatic paper feeder is installed so as to automate the paper insertion and removal operations. Since, however, the automatic paper feeder needs to be mounted outside an information processing apparatus, the whole system becomes large in size and is problematic regarding the portability thereof. Another problem is that the attachment and detachment of the automatic paper feeder are not easy. As a further problem, sheets of printer paper are set on the paper feed tray of the automatic paper feeder, and sheets of printed paper as printed results are delivered to the paper ejection tray of the feeder and are piled up thereon, so that the contents of the printed results can be viewed by another person other than the user, and the sheets of printer paper and printed paper might scatter to cause an unsightly scene around the system. These are serious problems, especially for a small-sized information processing apparatus whose portability is regarded as important and which will possibly be used in various places.

SUMMARY OF THE INVENTION

The present invention has for its object to provide an information processing apparatus having a built-in printer and exhibiting excellent portability characteristics.

In the first aspect of performance of the present invention for accomplishing the object, there is provided an information processing apparatus, comprising an input unit for entering data; a processor for processing the data entered through the input unit; a printer for printing the data processed by the processor; and a casing in which, at least, the input unit and the printer are accommodated; at least part of the printer being arranged on the side of the input unit normally facing the user.

In this case, the apparatus may well comprise a paper feeder for feeding the printer with a sheet of paper. Further, at least part of the paper feeder may well be arranged at a position which is lower than the input unit.

Besides, the information processing apparatus of so-called "clam-shell type" having a display for displaying the data processed by the processor, may well comprise a printed paper receptacle in which sheets of paper printed on by the printer are contained. Herein, it is allowed that the printed paper receptacle is arranged on a rear side of the display, and that it includes an insertion slit for inserting the printed paper therethrough, at a position mating with an ejection position of the printer for the printed paper when the display is shut. It is also allowed that the printed paper receptacle is arranged on a lower side of the input unit, and that it includes an insertion slit for inserting the printed paper therethrough, at a position mating with an ejection position of the printer for the printed paper when the display is shut. The printed paper receptacle may well be constructed including a space formed between the input unit and a display screen of the display when the display is shut.

In the second aspect of performance of the present invention, there is provided an information processing apparatus of so-called "clam-shell type", comprising an input unit for entering data; a processor for processing the data entered through the input unit; a display for displaying the data processed by the processor; and a printer for printing the data processed by the processor; at least part of the printer being arranged adjacent to the display.

In the third aspect of performance of the present invention, there is provided an information processing apparatus, comprising an input unit for entering data; a processor for processing the data entered through the input unit; a printer for printing the data processed by the processor; and a casing in which, at least, the input means and the printer are accommodated; the casing being provided with a paper passing slit through which a sheet of paper is passed when, at least either feeding the sheet of paper to the printer or ejecting the sheet of paper from the printer, at either of a position lying on the side of the input unit or a position lying laterally of the input unit.

In the fourth aspect of performance of the present invention, there is provided an information processing apparatus, comprising an input unit for entering data; a processor for processing the data entered through the input unit; a display for displaying the data processed by the processor; a printer for printing the data processed by the processor; and a casing in which, at least, the display and the printer are accommodated; the casing being provided with a paper passing slit through which a sheet of paper is passed when, at least either feeding the sheet of paper to the printer or ejecting the sheet of paper from the printer, in a plane which is substantially even with a display screen of the display.

In the fifth aspect of performance of the present invention, there is provided an information processing apparatus, comprising an input unit for entering data; a processor for processing the data entered through the input unit; a printer for printing the data processed by the processor; a paper conveyer having a conveyance path for conveying a sheet of paper, the paper conveyer performing, at least, either feeding of the sheet of paper to the printer or ejection of the sheet of paper from the printer along the conveyance path; and a casing in which, at least, the input unit and the printers are accommodated; the conveyance path being extended through either of the side of the input unit normally facing the user and a side lateral of the input unit.

In the sixth aspect of performance of the present invention, there is provided an information processing apparatus, comprising an input unit for entering data; a processor for processing the data entered through the input unit; a paper receptacle in which sheets of paper are contained, and which is arranged at a position lower than the input unit; and a casing in which the paper receptacle is accommodated, and whose bottom is provided with an opening for connecting the paper receptacle to the exterior of the apparatus.

In this case, the apparatus may well comprise a lid which opens and closes the opening. The lid may well have a contour which is substantially the same as that of the bottom of the casing.

It is also allowed that the paper receptacle includes a rest surface on which to place the sheets of paper; and that at least part of the rest surface comes into and out of the casing as the opening is closed and opened, respectively.

In the seventh aspect of performance of the present invention, there is provided an information processing apparatus, comprising an input unit for entering data; a processor for processing the data entered through the input unit; a display furnished with a display screen which displays the data processed by the processor; a paper receptacle in which sheets of paper are contained, and which is arranged at a position lying on a rear side of the display; and a casing in which the display means and the paper receptacle are accommodated, and which is provided with an opening for connecting the paper receptacle to the exterior of the apparatus, at a position lying on a rear side of the display screen.

In this case, the casing may well include a lid which opens and closes the opening. The lid may well have a contour which is substantially the same as that of a surface of the casing lying on the rear side of the display.

In the eighth aspect of performance of the present invention, there is provided an input/output apparatus for use in connection with other equipment, comprising an input unit for entering data; a processor for processing the data entered through the input unit; a printer for printing the data delivered from the processor, at least part of the printer being arranged on the side of the input unit normally facing the user; and a casing in which, at least, the input unit and the printer are accommodated.

In the first aspect of performance, the printer is arranged on the user's side of the input unit and is therefore convenient. Moreover, since the printer and the input unit are accommodated in the identical casing, the whole apparatus gives a very good impression of unitary construction and has excellent portability characteristics.

In addition, when an elastic member is disposed on that outer part of the casing accommodating the printer therein which overlies the printer, so as to be used as a palm rest, the operability of the apparatus in the input operation thereof is improved.

Further, since the sheet of paper ejected from the printer is received into the printed paper receptacle through the insertion slit when the apparatus is closed, the user of the apparatus can perform the print operation even when riding a streetcar, bus, subway or the like. Also, printed contents can be kept confidential.

Similar effects are attained in each of the second thru fifth aspects and the eighth aspect of performance.

In both of the sixth and seventh aspects of performance, the information processing apparatus comprises the paper receptacle in which the sheets of paper are contained. Accordingly, the user can hold memoranda etc. in the apparatus, which is convenient when he/she moves while carrying the apparatus. Moreover, the sheets of paper can be inserted and removed easily and reliably.

As summarized above, according to the information processing apparatus of the present invention, the built-in printer is well adapted for use. In addition, since the printed sheets of paper can be once held in the information processing apparatus, the user can perform the print operation when the apparatus is closed even under his/her movement carrying the apparatus, and the portability characteristics of the apparatus are excellent.

DESCRIPTION OF THE PREFERRED EMBODIMENTS

Now, one embodiment of the present invention will be described in conjunction with the accompanying drawings.

Figure 1:
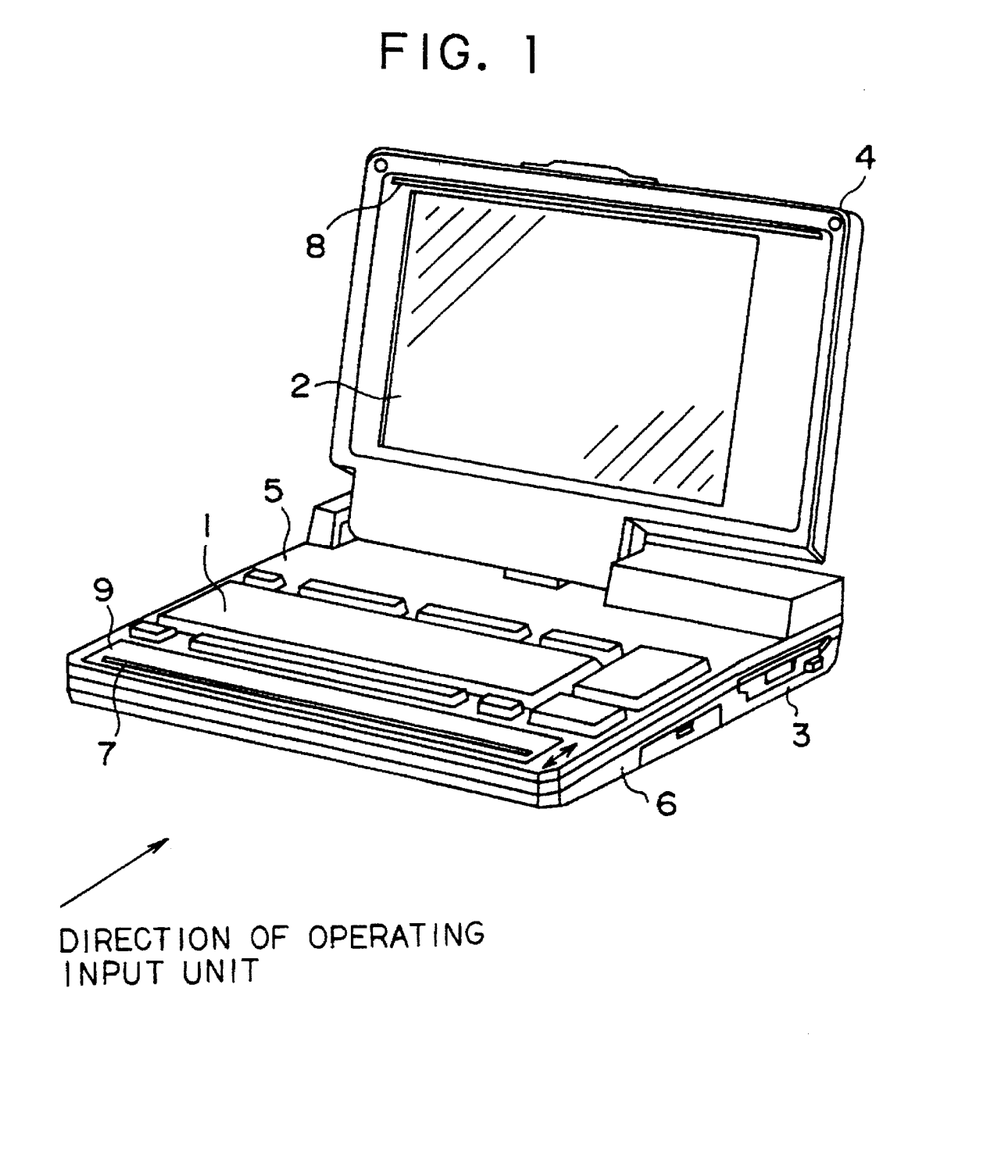
FIG. 1 is a perspective view showing the general construction of an information processing apparatus in one embodiment of the present invention.
Figure 2:
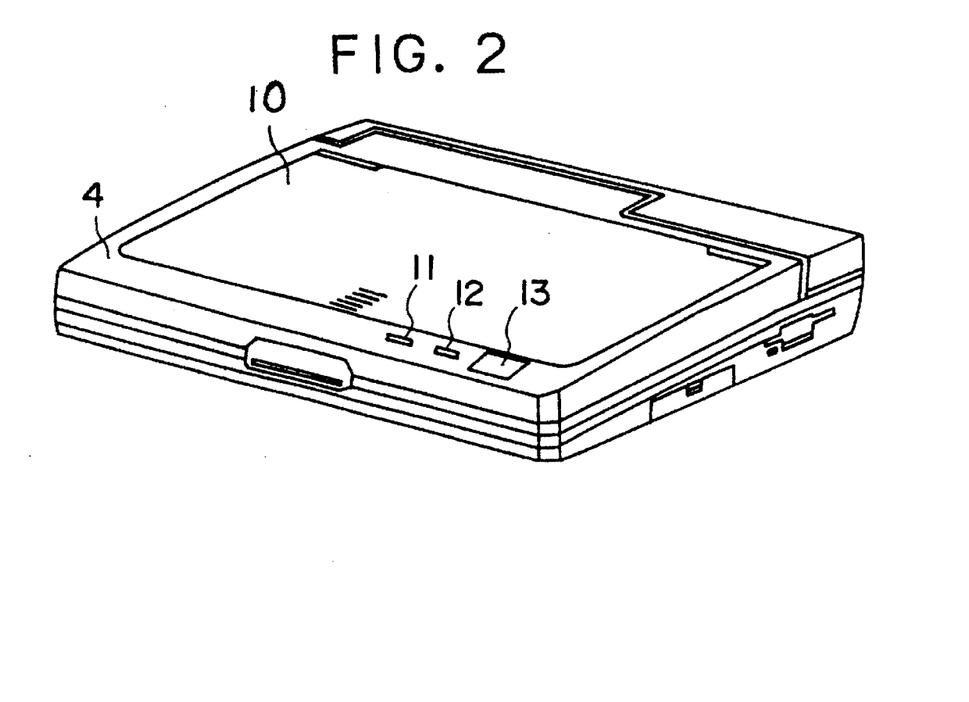
FIG. 2 is a perspective view showing the state of the apparatus in which an LCD (liquid-crystal display unit) case (4) is closed.
Figure 3:
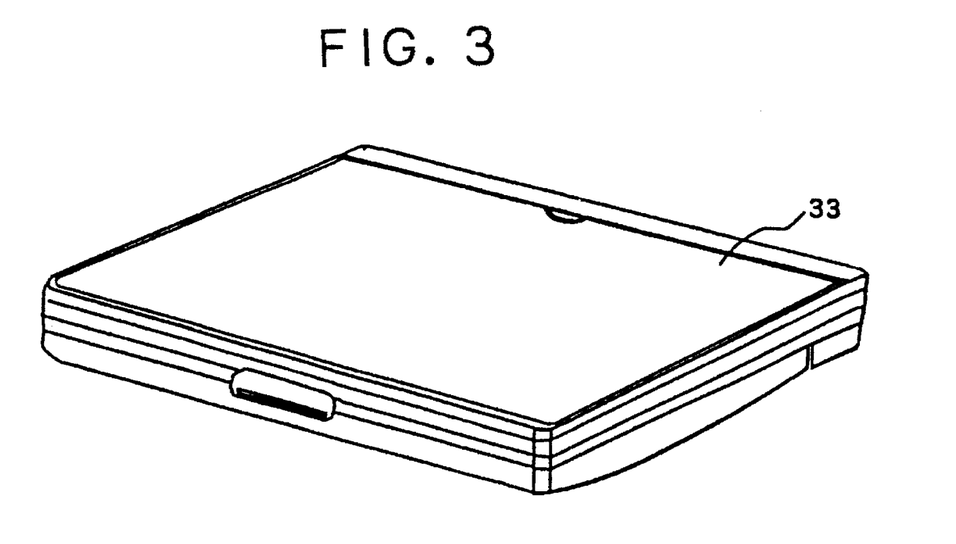
FIG. 3 is a perspective view of the first embodiment of the present invention as seen from the bottom side thereof.

The general construction of an information processing apparatus in this embodiment is illustrated in FIGS. 1, 2 and 3.

FIG. 1 shows the state of the apparatus in the ordinary operation of edit processing. The information processing apparatus is of a so-called "clam-shell type". This apparatus is chiefly constructed of an input unit 1 through which the user of the apparatus enters character inputs and inputs for designating functions, a liquid-crystal display unit 2 which displays documents etc., an FDD (flexible disk drive) 3 which serves to store an edited document etc., a control circuit board 29 (refer to FIG. 5) which serves to control the whole apparatus, and an upper body case 5, a lower body case 6 and an LCD (liquid-crystal display unit) case 4 in which the preceding constituents of the apparatus are accommodated or housed.

Figure 5:
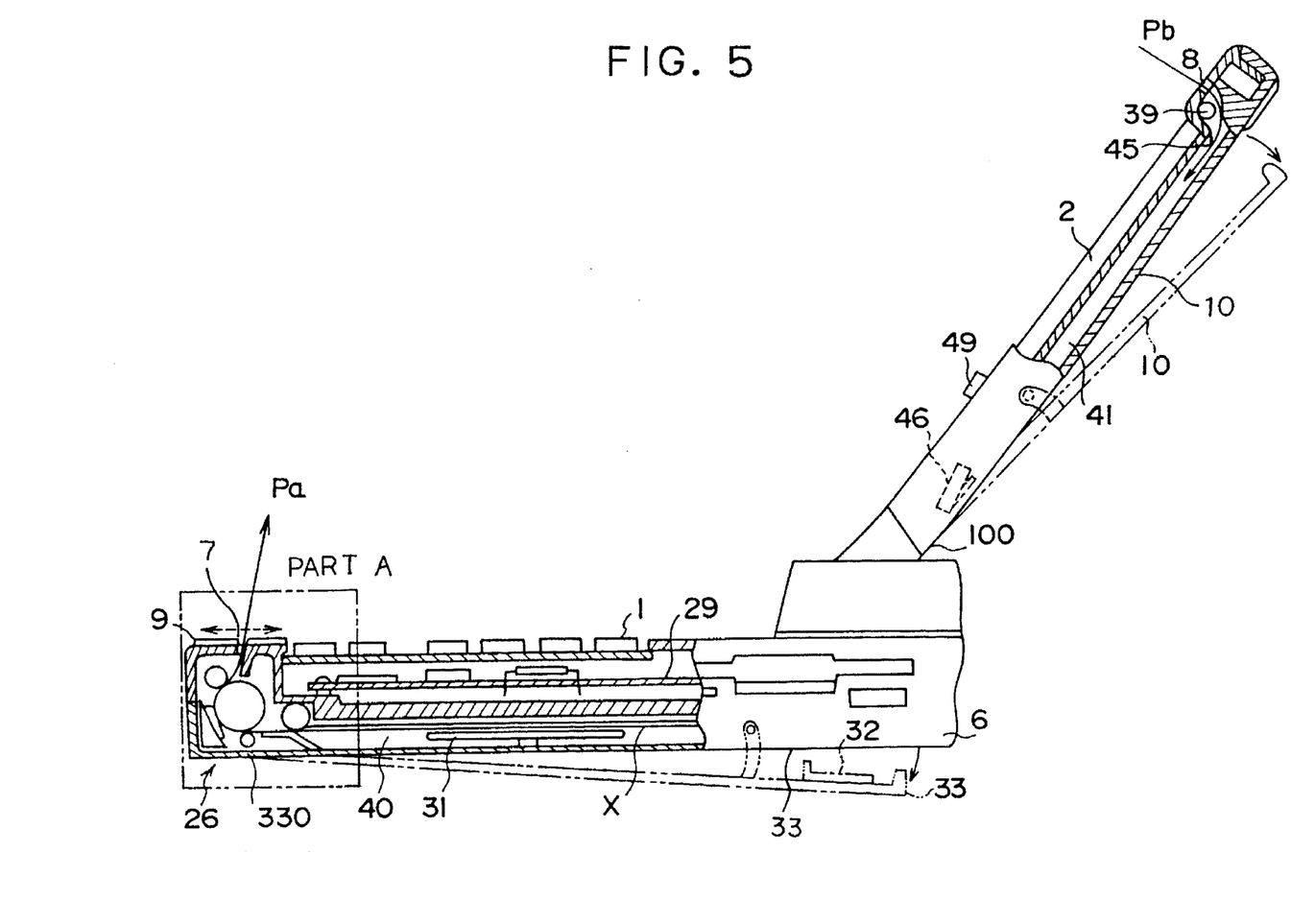
FIG. 5 is a side view, partially in section, showing the service state of the apparatus.

Further, in this embodiment, the print subunit 24 of a printer unit 26 (which is not shown in FIG. 1, but which is shown in FIG. 5) is built in on this side of the input unit 1, and a sheet of printer paper having been printed on is ejected through a paper ejection opening or slit 7. Besides, inside the LCD case 4, a printed paper receptacle 41 (which is not shown in FIG. 1, but which is shown in FIG. 5) is provided at the back of the liquid-crystal display unit 2, and the printed printer paper is inserted through a paper insertion opening or slit 8 so as to be received or contained in the receptacle 41. Numeral 9 in FIG. 1 denotes a movable pad which is slidable as indicated by a double-headed arrow.

FIG. 2 is a perspective view showing the state of the apparatus in which the LCD case 4 is closed. The outer surface of the LCD case 4 is provided with a printed paper receptacle lid 10 which can be removed or opened in order to take out the printed paper received or contained in the printed paper receptacle 41. Disposed on this side of the receptacle lid 10 are a power LED (light emitting diode) 11 for indicating the ON state of the power supply of the apparatus, a print LED 12 for indicating that a print operation is proceeding, and a print switch 13 for entering execution/stop commands for the printing in the state in which the LCD case 4 is held closed.

FIG. 3 is a perspective view in which the apparatus in the state shown in FIG. 2 is turned upside down. In FIG. 3, numeral 33 denotes a lid for a printer paper receptacle 40 shown in FIG. 5.

Since the relative locations of the printer unit 26 and printed paper receptacle 41 as mentioned above are the most important features of this embodiment, they will be explained in more detail later.

Figure 4:
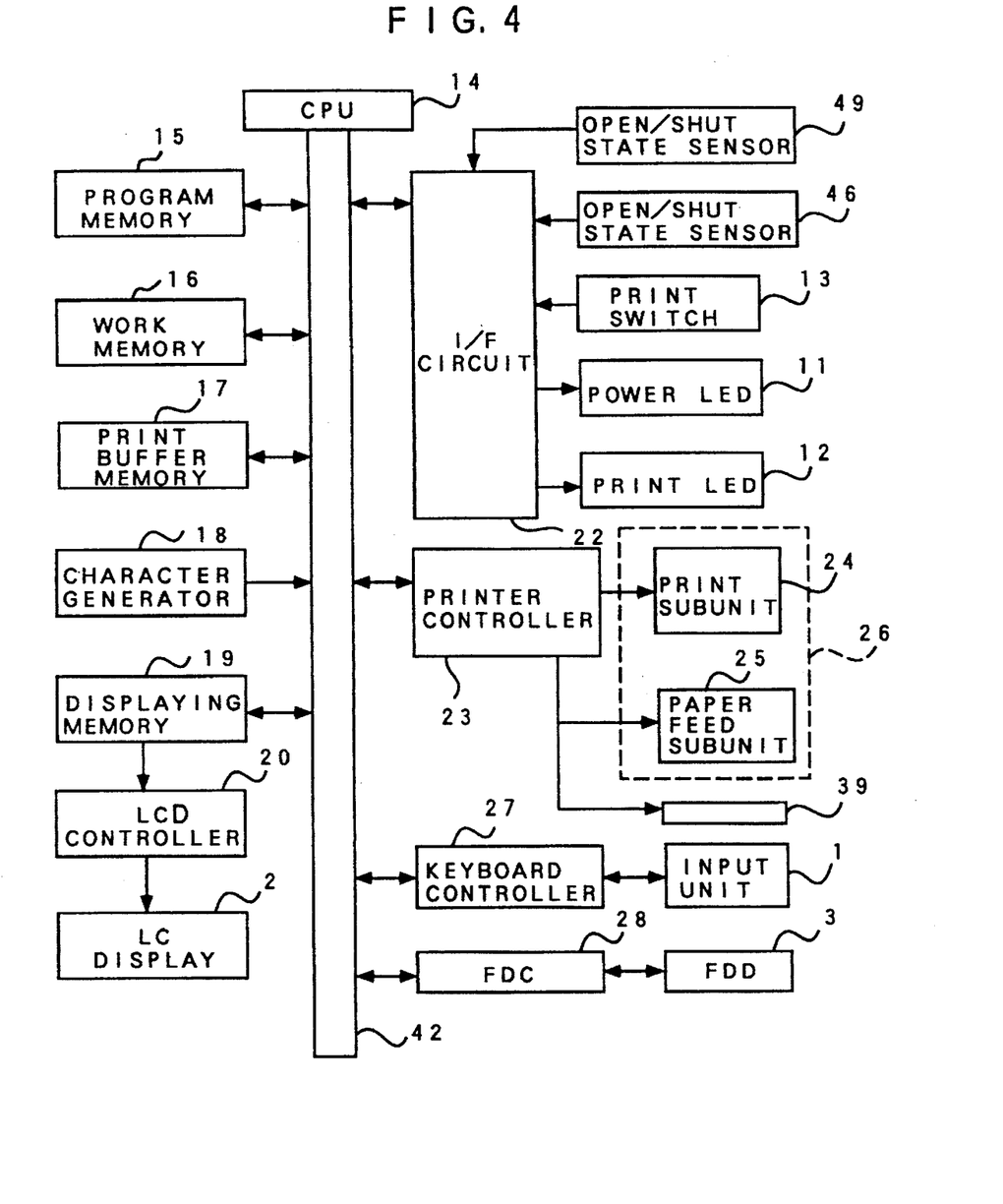
FIG. 4 is a block diagram showing the internal circuit arrangement of the apparatus.

FIG. 4 is a block diagram showing the arrangement of a main control circuit which is included in the information processing apparatus. The main control circuit is chiefly configured of a CPU (central processing unit) 14 which is a stored program type computation unit, a program memory 15 which stores therein programs for fulfilling the functions of the information processing apparatus after closure of the power supply, an information processing work memory 16 in which information processing data given as inputs are stored, a print buffer memory 17 in which the data of a print image are temporarily stored, a character generator 18 in which dot data expressive of characters are stored with character codes as indicial items, a displaying memory 19 in which display data are stored, an LCD (liquid-crystal display) controller 20 which governs a display control by transferring the stored data of the displaying memory 19 to the liquid-crystal display unit 2 every fixed cycle, a keyboard controller 27 which controls the input unit 1, an FDC (flexible disk controller) 28 which controls the FDD 3, an interface circuit 22 which interfaces as stated below, and a printer controller 23 which controls the printer unit 26 etc. The aforementioned constituents of the main control circuit exchange the data and perform the controls through a bus line 42.

The interface circuit 22 interfaces between the CPU 14 and various portions (for example, an open/closed state sensor 49 for detecting the open or closed state of the LCD case 4, an open/closed state sensor 46 for detecting the open or closed state of the printed paper receptacle lid 10, the print switch 13 for giving the command for executing or stopping the printing, the power LED 11 for indicating that the power supply of the apparatus is in the ON state, and the print LED 12 for indicating that the printing is under execution).

The printer controller 23 controls the printer unit 26 and a paper advancing roller 39 so as to perform the operations of printing characters and advancing the printer paper, etc. The printer unit 26 is composed of the print subunit 24 which includes a thermal head 34, a platen roller 37, etc., and a paper feed subunit 25 which includes a paper takingout roller 38, etc., as will be explained later.

The expression "print means" in the appended claims is equivalent to the print subunit 24 in this embodiment. In addition, the expression "paper feed means" is equivalent to the paper feed subunit 25.

Next, the printer unit 26 and the printed paper receptacle 41 which form the most important feature of this embodiment will be explained in detail with reference to FIGS. 5 thru 9.

In the print operation, the printer paper X is delivered out of the printer paper receptacle 40 arranged at the bottom of the lower body case 6 and is passed on this side of the input unit 1 (as viewed from the user of the apparatus), whereupon the printed paper is ejected through the paper ejection opening 7 (hereinbelow, a paper conveyance path which extends from the printer paper receptacle 40 to the paper ejection opening 7 shall be termed the "paper path Pa").

As shown in FIG. 5, the printer paper receptacle 40 for receiving or containing the printer paper X is arranged at the bottom of the lower body case 6. The bottom wall of the printer paper receptacle 40 forms part of the lower body case 6 as it is, and it can be opened downwards with a fulcrum at its front edge 330 (hereinbelow, the bottom wall which is free to be opened and closed shall be called the "printer paper receptacle lid 33"). The printer paper X is received in the printer paper receptacle 40 in such a way that the printer paper receptacle lid 33 is opened, and that sheets of paper are rested or placed on the inner surface of the printer paper receptacle lid 33 through the resulting rear inlet or entrance of the printer paper receptacle 40. In FIG. 5, the printer paper receptacle lid 33 in the open state is depicted by a two-dot chain line. For the brevity of illustration, however, a paper keeper 31 is depicted only in the state in which the lid 33 is closed. To the contrary, a paper keeper 32 is depicted only in the state in which the lid 33 is opened. By the way, an expression "rest surface" in the appended claims is equivalent to the inner surface of the lid 33 and the paper keeper 31.

In this embodiment, the inlet which is formed by opening the printer paper receptacle lid 33 is enlarged to the utmost by designing the contour (shape and size) of the lid 33 to be substantially the same as that (those) of the bottom surface of the lower body case 6 (refer to FIG. 3). Besides, the printer paper receptacle lid 33 is adapted to open down to an angular position at which, at least, part of the inner surface (the paper rest surface) thereof lies outside (below) the bottom position of the lower body case 6. Thus, the sheets of paper are inserted with ease. Moreover, even when using small-sized sheets of paper, the positioning etc. of the paper can be precisely effected, and the work of inserting the paper becomes more reliable. Unlike the inlet in this embodiment, an inlet cannot be made sufficiently large with a structure wherein the inlet is provided sideward of the lower body case 6 by way of example. It is accordingly comprehended that, when sheets of paper are to be replenished, they will collide with sheets of paper already contained. Incidentally, a printer paper receptacle 40" and a printer paper receptacle lid 33" in an embodiment to be described later (refer to FIG. 12) have sizes, shapes and an opening angle determined from the same viewpoint.

The printer paper receptacle 40 is provided with the paper keeper 31 (shown in FIG. 5) for exerting a vertical force on the printer paper X, a paper guide 30 (FIG. 6), and the paper keeper 32 (FIG. 5) for exerting a horizontal force on the printer paper X. Further, it is provided with the paper taking-out roller 38 (FIG. 6) which forms part of the paper feed subunit 25 stated before and which delivers the printer paper X directly. In the print operation, the paper taking-out roller 38 is rotated, whereby the printer paper X held in close contact with the taking-out roller 38 by the paper keeper 31, etc. is smoothly delivered along the paper path Pa.

Figure 6:
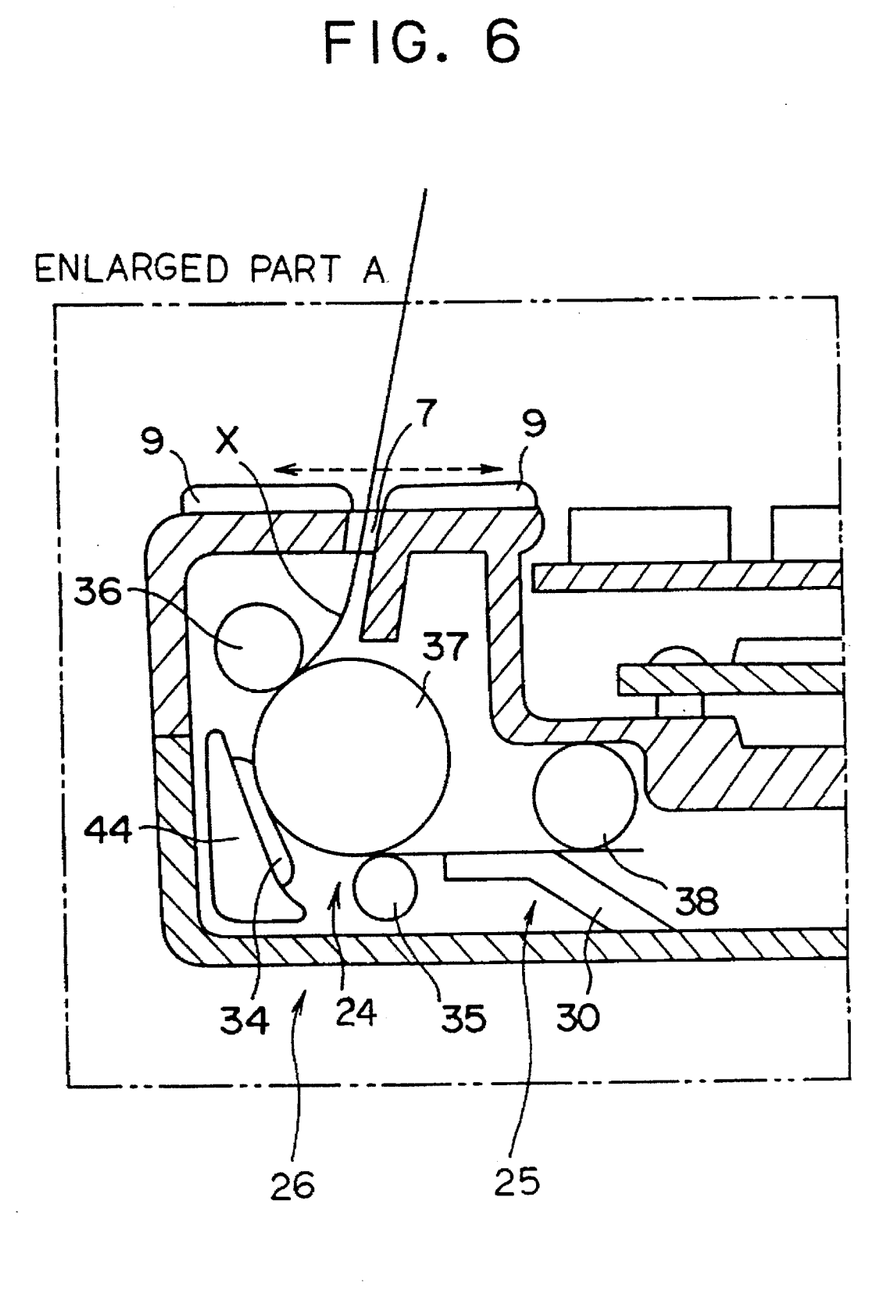
FIG. 6 is an enlarged sectional view showing part A indicated in FIG. 4.

As shown in FIG. 6, paper advancing rollers 35, 36, the platen roller 37, a head holder 44, and the thermal head 34 fixed to the head holder 44, which constitute the print subunit 24, are disposed in the section of the paper path Pa succeeding the printer paper receptacle 40. In this section, the platen roller 37 brings the printer paper X into close contact with the thermal head 34. Simultaneously, the thermal head 34 heats and prints desired characters or a desired pattern on the printer paper X in conformity with a command given by the printer controller 23. Thereafter, the printer paper X having been printed on is ejected out through the paper ejection opening 7 by the paper advancing roller 36.

In this embodiment, a thermal printer is adopted as the printer unit 26 (naturally, thermosensitive paper is adopted as the printer paper X in correspondence with the thermal printer), but the present invention is not restricted thereto. A print mechanism based on any other method may well be adopted.

The paper ejection opening 7 is formed as the slit which is long in the lateral direction of the apparatus as viewed from the operator thereof, at a position which lies on this side of the input unit 1 (refer to FIG. 1). Mounted over the paper ejection slit 7 is the movable pad 9 which is formed with an opening or slit having substantially the same contour as that of the paper ejection slit 7. The movable pad 9 is constructed so as to be slidable in the depth direction of the apparatus (as indicated by broken-line arrows in FIGS. 5 and 6), and it is slid for the following functions: During the execution of the print operation, the movable pad 9 uncovers the paper ejection slit 7, thereby allowing the printer paper X to be ejected. In contrast, at any time other than the print operation, the movable pad 9 covers the paper ejection slit 7, thereby preventing any foreign matter from intruding into the printer unit 26 through the paper ejection slit 7.

In addition, the movable pad 9 is constructed including an elastic member. Accordingly, it functions also as a palm rest on which the operator puts his/her hands when entering data through the input unit 1.

The information processing apparatus of this embodiment includes a conveyance path for conveying the printer paper X having been printed on, separately from the paper path Pa stated before. The conveyance path extends from the paper insertion opening or slit 8 located on the upper side of the display screen of the liquid-crystal display unit 2, to the printed paper receptacle 41 provided on the rear side of the liquid-crystal display unit 2 (refer to FIG. 5). Hereinbelow, the conveyance path shall be termed the "paper path Pb".

Figure 8A:
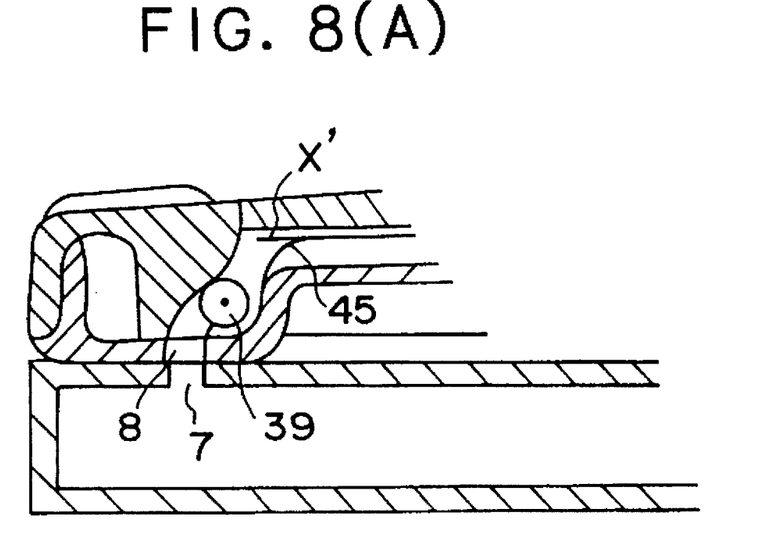
FIGS. 8(A) and 8(B) are explanatory views showing an operating mechanism for a paper keeper (45)
Figure 8B:
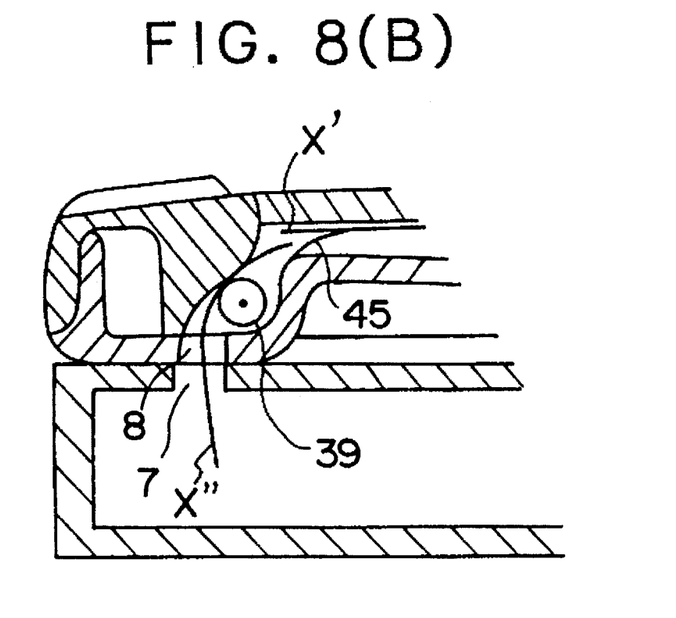

The insertion opening 8 is provided at a position at which it is opposed to and joined with the paper ejection slit 7 and the slit of the movable pad 9 uncovering the paper ejection slit 7, when the LCD case 4 is closed (refer to FIGS. 8(A) and 8(B)). Besides, the insertion opening 8 is in the shape of the slit which is long in the lateral direction of the apparatus as viewed from the operator, and the contour of which is substantially the same as that of the paper ejection slit 7 or the slit of the movable pad 9. Herein, the insertion slit 8 may well be made somewhat larger in size lest the printer paper X ejected out through the paper ejection slit 7 be caught in the joined section (this holds true also of the relationship between the contour of the paper ejection slit 7 and that of the slit of the movable pad 9).

As referred to above, the printed paper receptacle 41 is provided on the rear side of the liquid-crystal display unit 2 within the LCD case 4 and in parallel with this unit 2. In addition, the receptacle 41 is continuous with the insertion slit 8 at its upper end side as viewed in FIG. 5, and it is adapted to receive and hold the printer paper X inserted through the insertion slit 8. An outer wall surface defining the printed paper receptacle 41, directly forms part of the outer surface of the LCD case 4, and it is constructed so as to be opened and closed with a fulcrum at its lower edge 100 as viewed in FIG. 5 (as referred to before, the outer surface part which is free to be opened and closed shall be called the "printed paper receptacle lid 10"). Accordingly, the printer paper X contained in the receptacle 41 is taken out by opening the printed paper receptacle lid 10. The printed paper receptacle lid 10 has substantially the same contour as that of the surface of the LCD case 4 corresponding to the rear side of the display screen of the display unit 2 (refer to FIG. 2). Thus, the opening or outlet of the printed paper receptacle lid 10 in the open state thereof can be enlarged to the utmost, and the sheets of paper are taken out with ease. A printed paper receptacle 41" and a printed paper receptacle lid 10" in the different embodiment to be described later (refer to FIG. 12) have shapes and sizes determined from the same viewpoint. Incidentally, the printed paper receptacle 41 is furnished with the open/closed state sensor 46 for detecting the open or closed state of the printed paper receptacle lid 10, and the detected result thereof is delivered to the interface circuit 22 of the control circuit stated before (refer to FIG. 4).

The paper advancing roller 39, a paper keeper 45, etc. are interposed between the paper insertion slit 8 and the printed paper receptacle 41 in order to smoothly insert and receive the sheet of paper.

Figure 7A:
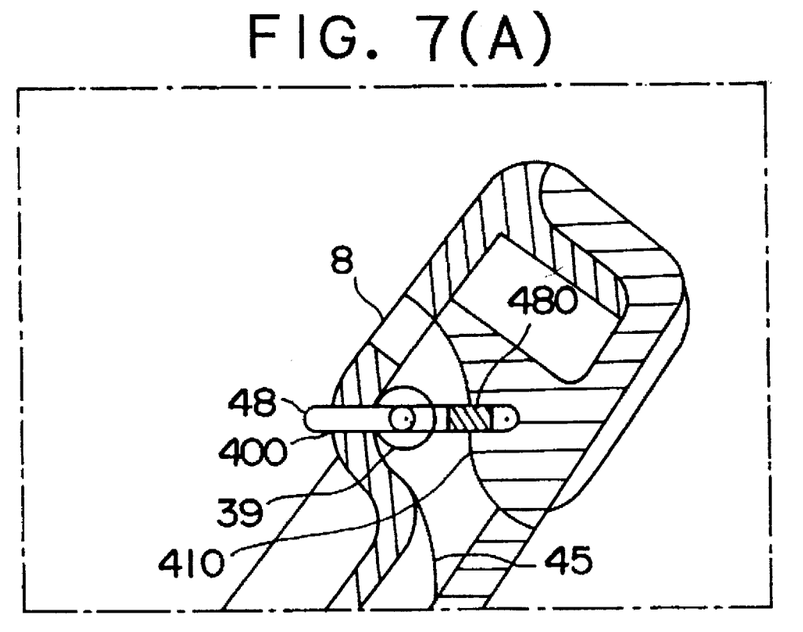
FIGS. 7(A) and 7(B) are explanatory views showing an operating mechanism for a paper advancing roller (39)
Figure 7B:
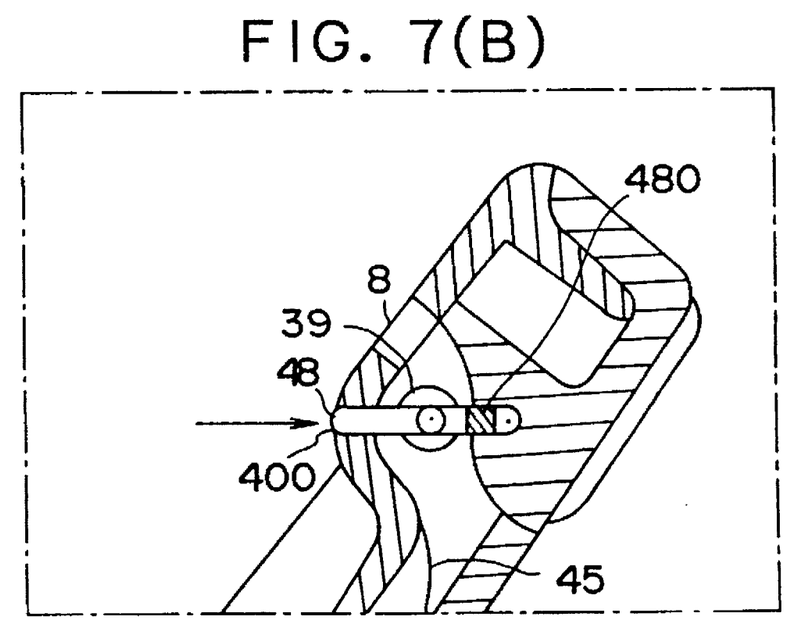

As illustrated in FIGS. 7(A) and 7(B), the paper advancing roller 39 is arranged at a position near the inner side of the insertion slit 8, in the state in which both ends thereof are supported by a pair of roller support members 48. The paper advancing roller 39 is constructed so that the sheet of paper may be sandwiched in between this roller and an opposite surface 410 and may be advanced into the printed paper receptacle 41 up to its rear end without fail. Incidentally, the paper advancing roller 39 is driven and forcibly rotated by an electric motor which is not shown in these figures.

Each of the roller support members 48 has one end fixed to the inner side of the LCD case 4, and has the other end jutted out of a hole 400 which is provided on the display screen side of the LCD case 4. In addition, part of the roller support member 48 is made of a spring 480. Thus, the springs 480 of the roller support members 48 are both compressed in accordance with forces acting on the juts thereof, and they shift the axial position of the paper advancing roller 39, thereby bringing this paper advancing roller 39 into or out of touch with the opposite surface 410 (FIG. 7(A) shows the untouched or spaced state of the elements 39 and 410, while FIG. 7(B) shows the touched state). Herein, the juts abut against the upper body case 5 when the LCD case 4 is closed. In the closed state of the LCD case 4, the illustrated mechanism falls into the state in which the sheet of paper can be advanced by the paper advancing roller 39 (that is, the state in which the roller 39 is in touch with the opposite surface 410), whereas in the open state of the LCD case 4, the mechanism falls into the state in which the sheet of paper cannot be advanced (that is, the state in which the roller 39 is out of touch with the opposite surface 410).

The paper keeper 45 is disposed deeper than (or inward of) the paper advancing roller 39. This paper keeper 45 has an elasticity, and urges the received sheet of paper (indicated by symbol X') unidirectionally with a force which hardly hampers a paper advancing force for the sheet of paper (refer to FIG. 8(A)). Thus, the sheet of paper (indicated by symbol X") being newly received and the sheet of paper X' having already been received are prevented from colliding with each other and causing a paper jam (refer to FIG. 8(B)).

Figure 9:
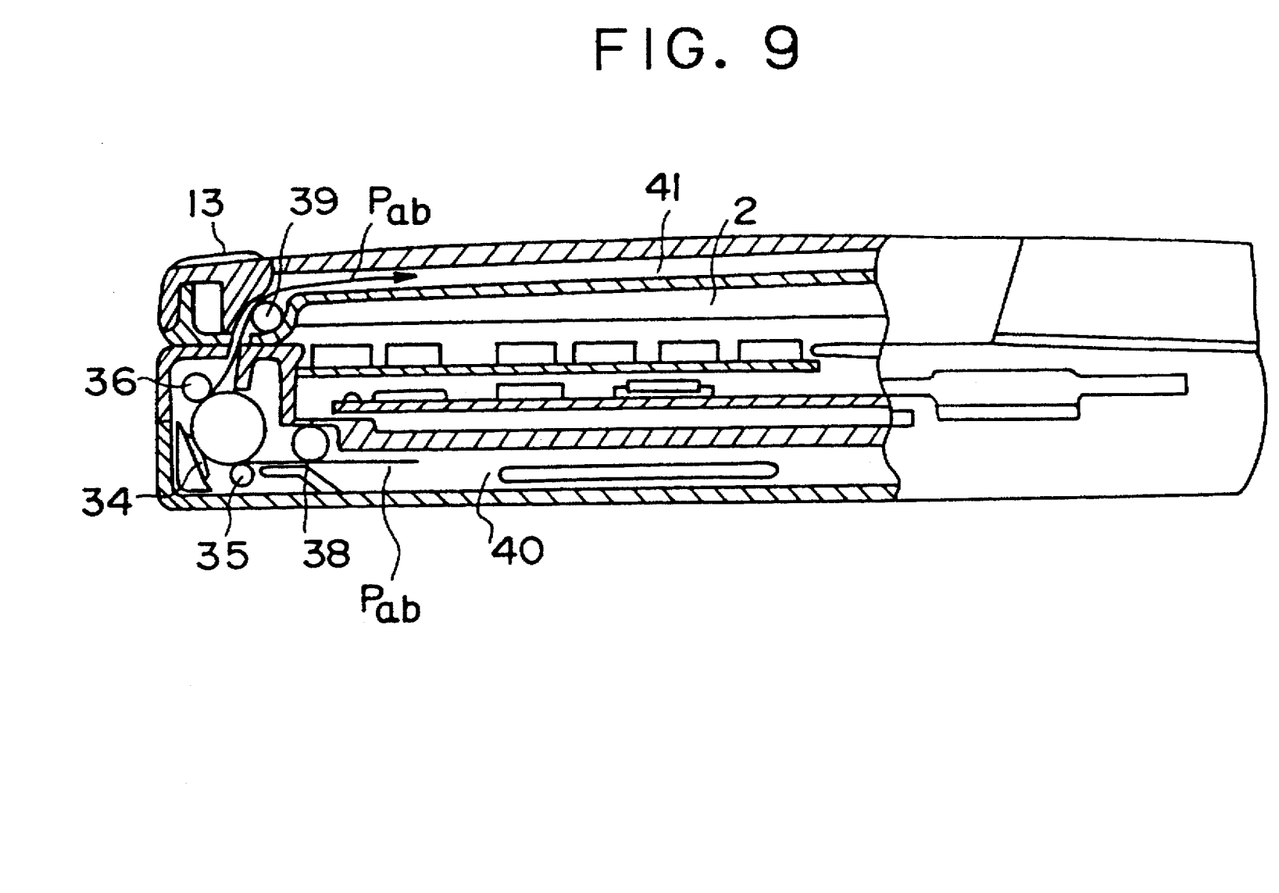
FIG. 9 is a side view, partially in section, showing the state of the apparatus in which the LCD case (4) is closed.

The paper paths Pa and Pb explained before do not function quite independently of each other, but they join together in the closed state of the LCD case 4 to form a single conveyance path which extends from the printer paper receptacle 40 to the printed paper receptacle 41 through the front side of the input unit 1 (hereinbelow, the single conveyance path consisting of the succession of the paper paths Pa and Pb shall be termed the "paper path Pab"). The paper path Pab is shown in FIG. 9.

The print operations of this embodiment will now be explained.

In order to execute the printing, the user or operator of the apparatus first performs preparatory work, such as the designation of a document file to-be-printed, by the use of the input unit 1. Naturally, the operator performs the preparatory work in the state in which the LCD case 4 is opened. If necessary, he/she opens the printer paper receptacle lid 33 and puts the sheets of printer paper into the printer paper receptacle 40.

On the condition that the printing is to be executed with the LCD case 4 left open, the operator subsequently gives an instruction for starting the printing, by the use of the input unit 1. Then, the printer unit 26, etc. starts the print operation as stated below.

The paper taking-out roller 38, etc. deliver the printer paper X contained in the printer paper receptacle 40, along the paper path Pa. Besides, the thermal head 34, etc. prints characters and/or a pattern on the delivered printer paper X. Thereafter, the printer paper having been printed on is ejected out of the printer unit 26 through the paper ejection slit 7. In this case, accordingly, the user can immediately check the printed content. When the printer paper having been printed on needs to be kept in custody, the user may manually insert the printed printer paper into the printed paper receptacle 41 through the insertion slit 8. Since, on this occasion, the LCD case 4 is open (that is, the paper advancing roller 39 and the opposite surface 410 are in the spaced state as shown in FIG. 7(A)), the paper advancing roller 39 does not form an obstacle to the insertion of the printer paper.

By the way, in this case, the CPU 14 does not actuate the paper advancing roller 39 because the open state of the LCD case 4 has been detected by the sensor 49.

On the other hand, on the condition that the printing is to be executed with the LCD case 4 closed, the user closes the LCD case 4 when he/she has completed the preparatory work. Besides, he/she depresses the print switch 13 to give an instruction for starting the printing. Then, the print operation, which is basically the same as in the above case, is executed until the printer paper X having been printed on is ejected out through the paper ejection slit 7. In this case, however, the printer paper X is inserted into the insertion slit 8 at the same time as the ejection thereof through the paper ejection slit 7, and it is automatically received into the printed paper receptacle 41 with the LCD case 4 held closed. On this occasion, the paper keeper 45 functions to prevent the collision between the sheet of printer paper X" being newly received and the sheet of printer paper X' having already been received (refer to FIG. 8(B)). In addition, since the closed state of the LCD case 4 has been detected by the sensor 49, the CPU 14 actuates the paper advancing roller 39 in interlocking with the paper advancing rollers 35 and 36, thereby advancing the sheet of printer paper X" into the printed paper receptacle 41 up to the rear end thereof without fail.

While the print operation is executed, the print LED 12 turns ON to emit light, so that the operator can monitor the operating state outside the apparatus. Besides, when the operator wants to stop the print operation in the course of the printing, he/she may depress the print switch 13 again.

When executing the printing in the closed state of the LCD case 4, the CPU 14 is monitoring the number of printed sheets of paper, and it temporarily stops the printing when a predetermined number of printed sheets ($\leq$ the receiving or storage capacity of the printed paper receptacle 41) has been reached. Accordingly, the printed paper receptacle 41 can be prevented from receiving the sheets of printer paper in excess of its full capacity and having a paper jam during printing. A sensor which detects the quantity of printer sheets paper contained in the printed paper receptacle 41 may well be mounted so as to stop printing when the sheets of printer paper have reached a predetermined quantity. The detection of the quantity of the sheets of printer paper can be done by detecting, for example, the deflection angle or deformation magnitude of the paper keeper 45.

After the printing has ended, or when the print operation has been stopped because of the printed sheets of paper reaching the predetermined number, the operator of the apparatus opens the printed paper receptacle lid 10 and takes out the printer paper X. Incidentally, the CPU 14 is monitoring the open or closed state of the printed paper receptacle lid 10 through the open/closed state sensor 46, and it temporarily stops the print operation when the printed paper receptacle lid 10 has been opened during the printing. Besides, the CPU 14 restarts the printing automatically when the printed paper receptacle lid 10 has been closed. On this occasion, when the apparatus includes the sensor for detecting the quantity of paper sheets contained in the printed paper receptacle 41, the CPU 14 restarts the printing upon confirming that the sheets of paper have been taken out.

Next, the situation of the pertinent section of the apparatus in the case where the LCD case 4 is opened during the course of the printing with this case 4 closed will be explained with reference to FIGS. 7(A) and 7(B).

In the state in which the LCD case 4 is shut, the pertinent section falls into the state in which the respective juts of the pair of roller support members 48 abut on the upper body case 5 to be pushed in the corresponding holes 400 and in which the springs 480 are compressed to contract. In this state, the paper advancing roller 39 and the opposite surface 410 are held in pressed contact (refer to FIG. 7(B)). Therefore, when the paper advancing roller 39 is rotated, the sheet of printer paper sandwiched in between it and the opposite surface 410 is advanced into the printed paper receptacle 41. In contrast, in the state in which the LCD case 4 is opened, the pertinent section falls into the state in which the springs 480 elongate. In this state, the paper advancing roller 39 is spaced from the opposite surface 410 (refer to FIG. 7(A)). Therefore, even the sheet of paper held between the paper advancing roller 39 and the opposite surface 410 can be freely put in or taken out by hand. Accordingly, even in a case, for example, where the LCD case 4 has been opened in the state in which part of a certain sheet of printer paper has already been inserted into the paper insertion slit 8, but in which the remaining part thereof has not perfectly come out of the paper ejection slit 7 yet, the part inserted in the insertion slit 8 can be drawn out again, and hence, the sheet of printer paper does not tear. In the meantime, the print operation itself is not affected, and the printing can be continued with the LCD case 4 left open.

As thus far described, in this embodiment, the printer paper having been printed on is ejected to the user side of the apparatus, so that it is easily handled to render good operability of the apparatus. In addition, when the print operation is executed with the LCD case 4 closed, each printed sheet of paper is automatically received and kept in custody without being ejected out of the apparatus, so that the user can perform the printing even when he/she is moving while carrying the information processing apparatus. Besides, the apparatus provides excellent privacy characteristics for the printed contents on this occasion. Further, since the part of the apparatus overlying the print subunit 24 can be used also as a palm rest, the operability of the apparatus for the input operation is excellent. Still further, even when the LCD case 4 is opened in the middle of the printing which is executed in the closed state of the LCD case 4, the sheet of printer paper does not tear, and the print operation itself is not affected, either. Yet further, jamming of paper can be prevented from occurring.

Moreover, since the printer unit 26, the keyboard, etc. are accommodated in the identical casing, the whole apparatus gives an intense impression of unitary construction and has excellent portable characteristics. Incidentally, the same holds true also of the embodiment to be described later, in which the printer unit 26 is disposed on the side of the display unit 2.

Now, the second embodiment of an information processing apparatus in which the printer unit 26 is installed at a different position will be described with reference to FIGS. 10 and 11.

Figure 10:
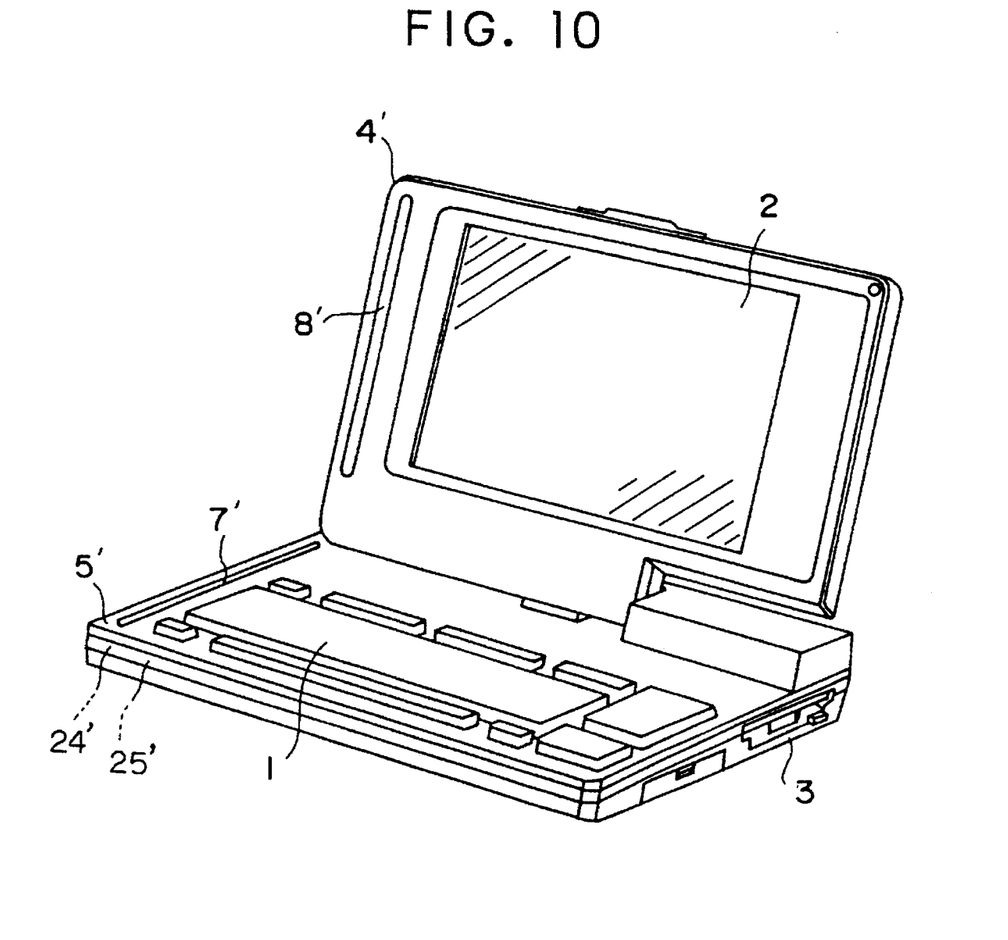
FIG. 10 is a perspective view showing an information processing apparatus in the second embodiment of the present invention.
Figure 11:
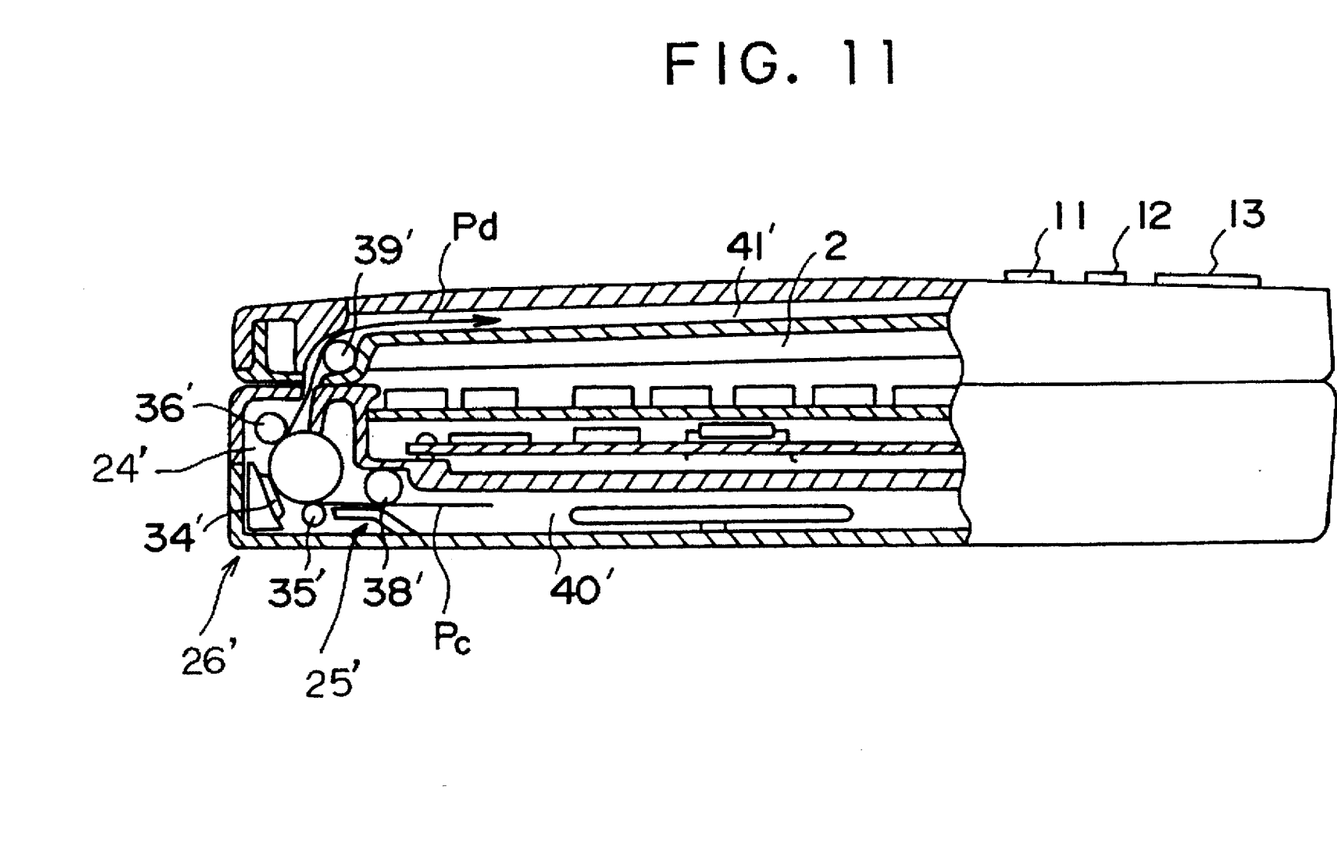
FIG. 11 is a side view, partially in section, showing the state of the second embodiment in which an LCD case (4) is closed.

FIG. 10 illustrates the example in which a print subunit 24' is arranged on one side of the apparatus extending in the depth direction thereof toward the liquid-crystal display unit 2. Herein, since the print subunit 24' is located on the left side of the casing of the apparatus, a paper ejection opening or slit 7' and a paper insertion opening or slit 8' are respectively provided on the left sides of an upper body case 5' and an LCD case 4'. In addition, the axial or extending directions of a paper feed subunit 25', a printed paper receptacle 41', etc. are naturally altered in conformity with the slits 7' and 8'. Accordingly, paths for conveying sheets of printer paper consist of a paper path Pc which extends from the lower side of the input unit 1 to the paper ejection slit 7' through the left side of the input unit 1, and a paper path Pd which extends from the paper insertion slit 8' lying at the left of the liquid-crystal display unit 2 to the rear side of the liquid-crystal display unit 2 (refer to FIG. 11). With this example, when performing a print operation in the state in which the LCD case 4' is opened, the screen of the display unit 2 is not concealed by the sheet of printer paper which has been printed on and which emerges from the paper ejection slit 7'. Accordingly, this example is effective for performing an edit operation in parallel with the print operation owing to a multitask function.

Figure 12:
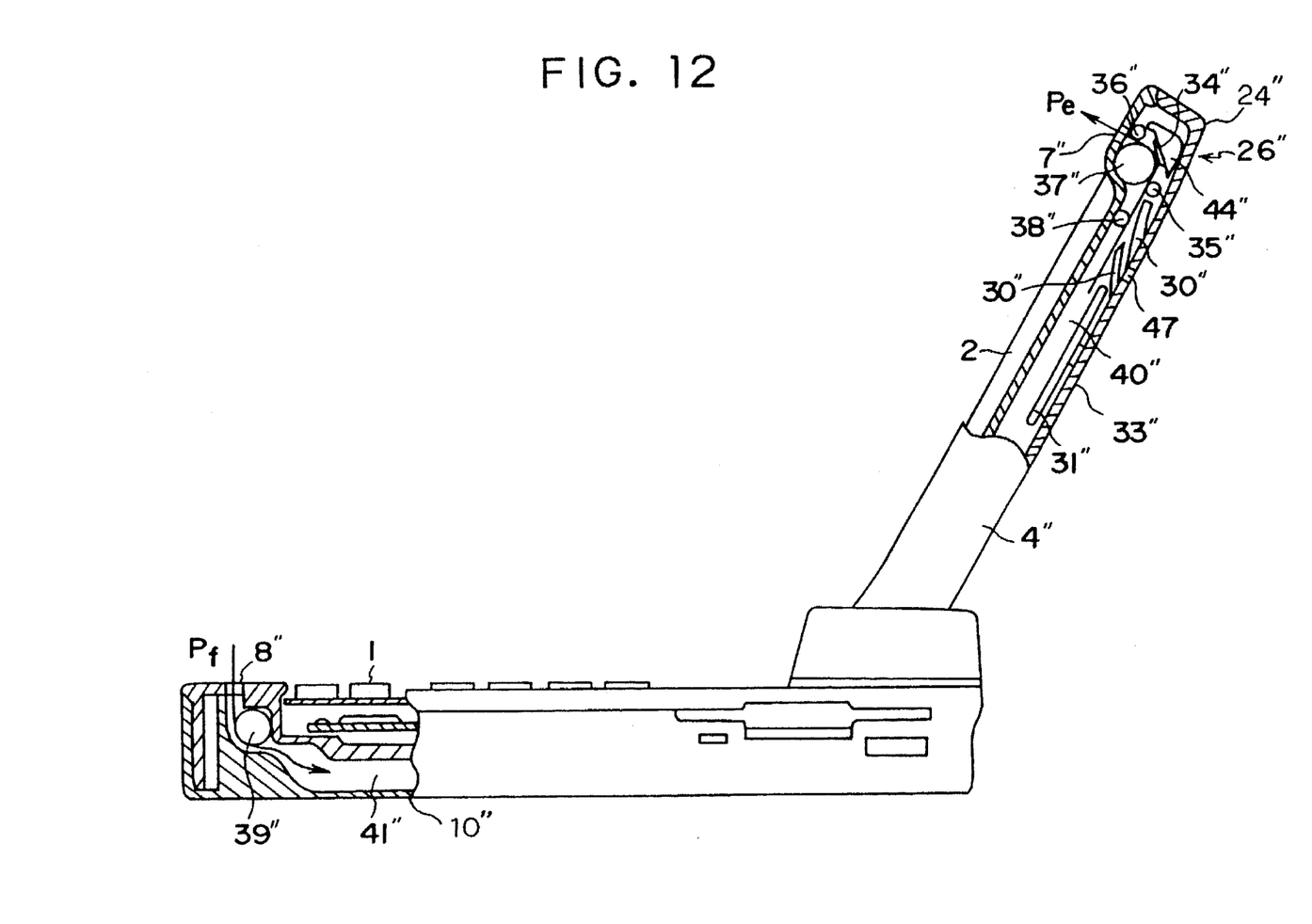
FIG. 12 is a side view, partially in section, showing an information processing apparatus in the third embodiment of the present invention.

FIG. 12 illustrates the third embodiment in which, contrary to the first embodiment, a printer unit 26" is arranged inside an LCD case 4", while the printed paper receptacle 41" is arranged below the input unit 1.

The print subunit 24" of the printer unit 26" (which includes a paper advancing roller 35", a paper advancing roller 36", a platen roller 37", a paper taking-out roller 38", a thermal head 34", and a head holder 44") is arranged at the distal-end position of the LCD case 4". In addition, the printer paper receptacle 40" (which includes a pair of paper guides 30", a paper keeper 31", and a paper keeper 32") is arranged behind the display unit 2. The constituents mentioned above are basically the same in construction as the corresponding constituents of the first embodiment (refer to FIG. 5), respectively.

Further, in this embodiment, a manual insertion opening or slit 47 for inserting the sheet of printer paper X by hand is provided in the printer paper receptacle lid 33". The printer paper X inserted through the manual insertion slit 47 reaches the paper taking-out roller 38". Thenceforth, the printer paper X is printed on and conveyed along substantially the same paths as in the foregoing case where it is fed from the printer paper receptacle 40. Accordingly, this embodiment permits the user of the apparatus to directly supply the sheet of paper by the manual insertion, and it is effective when, for example, printing on a sheet of paper of undefined format. Incidentally, the manual insertion slit can be provided also in each of the embodiments described before.

In the execution of the print operation, the sheet of printer paper X is advanced and printed by traveling along the paper path Pe (refer to FIG. 12), and it is thereafter ejected through a paper ejection opening or slit 7". Alternatively, it is received into the printed paper receptacle 41" by traveling along the paper path Pf in succession to the paper path Pe.

Figure 13:
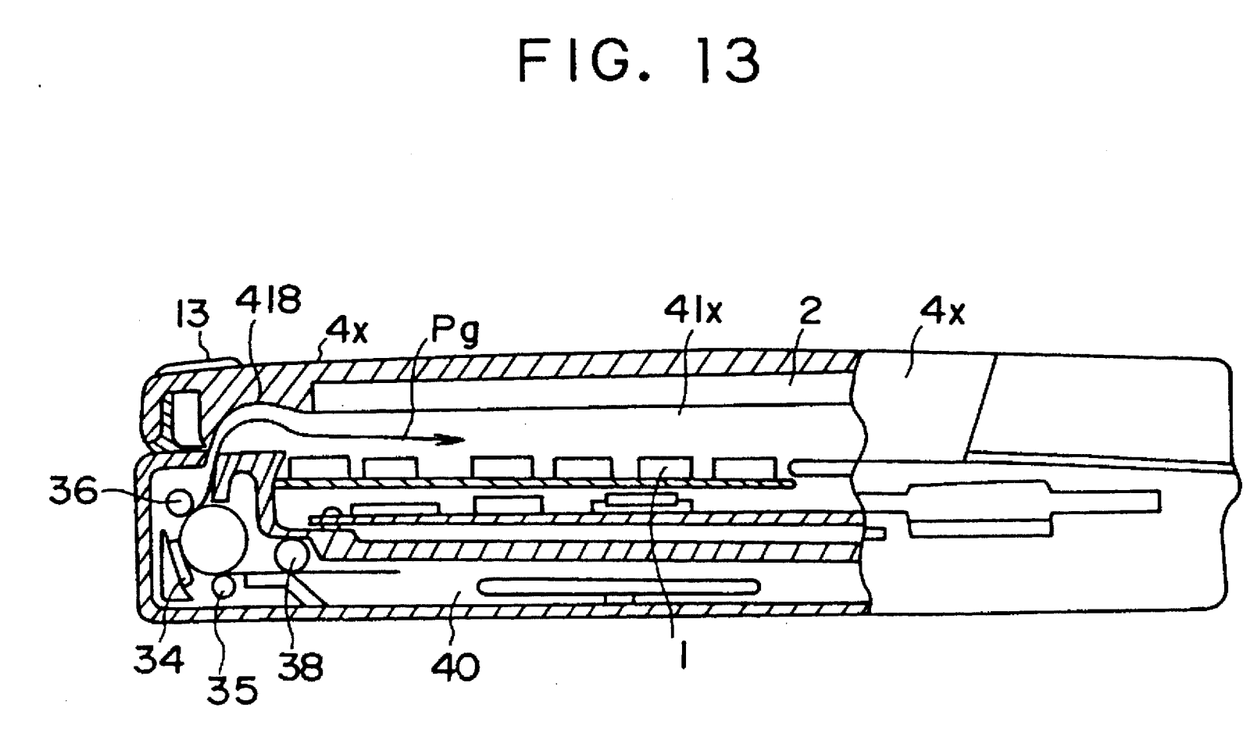
FIG. 13 is a side view, partially in section, showing an information processing apparatus in the fourth embodiment of the present invention.

FIG. 13 illustrates the fourth embodiment in which a space that is defined between the input unit 1 and the liquid-crystal display unit 2 upon shutting an LCD case 4X is directly utilized as a printed paper receptacle 41X. That surface of the LCD case 4X on which the display unit 2 is mounted, is formed with a curved guide surface 418 at a position corresponding to the paper ejection slit 7. In addition, the top surface of each key of the input unit 1 is designed so as not to interfere with or catch the sheet of printer paper. By way of example, although not clearly seen from the drawing, the corners of each key on this side as viewed from the operator of the apparatus are cut away. Accordingly, the sheet of paper ejected through the paper ejection slit 7 is received into the printed paper receptacle 41X quickly without being caught by the keys halfway.

When printing in the closed state of the LCD case 4X, the sheet of paper ejected through the paper ejection slit 7 strikes the curved guide surface 418 at its front end and has its advancing direction turned. Thereafter, it travels along a paper path Pg to be received into the printed paper receptacle 41X.

The printer paper contained in the printed paper receptacle 41X can be taken out by opening the LCD case 4X.

Each of the embodiments described above is excellent retaining the printer paper and has excellent characteristics regarding the portability of the whole apparatus, and is excellent regarding the operability of the print operation.

Besides, the printed paper receptacle 41 is convenient as documents, memoranda etc. can also be stored therein.

Although the information processing apparatus of the "clam-shell type" has been referred to in the foregoing description, the present invention is not restricted thereto. The positional relationships among the printer unit, the input unit (for example, keyboard) and the display unit in the present invention are also applicable to information processing apparatuses of other portable types.

It is similarly possible to fabricate an input/output apparatus in which the printer unit and a separate keyboard including no information processing function are united in any of the positional relationships of the present invention.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An information processing apparatus, comprising:
   input means for entering data;
   processing means for processing the data entered through said input means;
   print means for printing the data processed by said processing means;
   a casing in which at least said input means and said print means are accommodated; and
   paper feed means for feeding said print means with a sheet of paper,
   wherein at least part of said print means is arranged on a front portion of said input means facing a user.

2. An information processing apparatus as defined in claim 1, wherein at least part of said paper feed means is arranged at a position which is lower than said input means.

3. An information processing apparatus, said information processing apparatus being a "clam-shell type" apparatus, comprising:
   input means for entering data;
   processing means for processing the data entered through said input means;
   print means for printing the data processed by said processing means;
   display means for displaying said data processed by said processing means and a printed paper receptacle in which sheets of paper printed on by said print means are contained; and
   a casing in which at least said input means and said print means are accommodated;
   wherein at least part of said print means is arranged on a front portion of said input means facing the user.

4. An information processing apparatus as defined in claim 3, wherein said printed paper receptacle is arranged on a rear side of said display means, and said printed paper receptacle includes an insertion slit for inserting the printed paper therethrough, at a position mating with an ejection position of said print means for said printed paper when said display means is closed.

5. An information processing apparatus as defined in claim 3, wherein said printed paper receptacle is arranged on a lower side of said input means, and said printed paper receptacle includes an insertion slit for inserting the printed paper therethrough, at a position mating with an ejection position of said print means for said printed paper when said display means is closed.

6. An information processing apparatus as defined in claim 3, wherein said printed paper receptacle includes a space formed between said input means and a display screen of said display means when said display means is closed.

7. A "clam-shell type" information processing apparatus, comprising:
   input means for entering data;
   processing means for processing the data entered through said input means;
   display means for displaying the data processed by said processing means;
   print means for printing said data processed by said processing means;
   storage means for storing paper to be used for said printing; and
   a housing in which said print means, said storage means and said display means are accommodated;
   at least part of said print means being arranged in adjacency to said display means.

8. An information processing apparatus, comprising:
   input means for entering data;
   processing means for processing the data entered through said input means;
   a paper receptacle in which sheets of paper are contained, and which is arranged at a position lower than said input means; and
   a casing in which said input means and said paper receptacle are accommodated, and the bottom of said casing is provided with an opening for connecting said paper receptacle to the exterior of said apparatus.

9. An information processing apparatus as defined in claim 8, further comprising a lid which opens and closes said opening.

10. An information processing apparatus as defined in claim 9, wherein said lid has a contour which is substantially the same as that of said bottom of said casing.

11. An information processing apparatus as defined in claim 8, wherein:
    said paper receptacle includes a rest surface for placing the sheets of paper thereon and
    at least part of said rest surface comes into and out of said casing as said opening is closed and opened, respectively.

12. An information processing apparatus, comprising:
    input means for entering data;
    processing means for processing the data entered through said input means;
    display means furnished with a display screen for displaying the data processed by said processing means;
    a paper receptacle in which sheets of paper are contained, and which is arranged at a position lying on a rear side of said display means; and
    a casing in which said display means and said paper receptacle are accommodated, and which is provided with an opening for connecting said paper receptacle to the exterior of said apparatus, at a position lying on a rear side of said display screen.

13. An information processing apparatus as defined in claim 12, wherein said casing includes a lid which opens and closes said opening.

14. An information processing apparatus as defined in claim 13, wherein said lid has a contour which is substantially the same as that of a surface of said casing lying on the rear side of said display means.

* * * * *